United States Patent
Gardner et al.

(10) Patent No.: US 8,611,457 B2
(45) Date of Patent: Dec. 17, 2013

(54) MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES

(75) Inventors: James Gardner, Santa Clara, CA (US); Vincent K. Jones, IV, Santa Clara, CA (US); D. J. Richard van Nee, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/073,701

(22) Filed: Mar. 28, 2011

(65) Prior Publication Data

US 2011/0317775 A1    Dec. 29, 2011

Related U.S. Application Data

(63) Continuation of application No. 10/820,440, filed on Apr. 5, 2004, now Pat. No. 7,916,803.

(60) Provisional application No. 60/461,999, filed on Apr. 10, 2003.

(51) Int. Cl.
*H04L 27/00* (2006.01)

(52) U.S. Cl.
USPC ........... 375/295; 375/260; 375/267; 375/299; 375/347; 375/349

(58) Field of Classification Search
USPC .................. 375/295, 260, 267, 299, 347, 349
See application file for complete search history.

(56) References Cited

U.S. PATENT DOCUMENTS 5,131,006 A    7/1992 Kamerman et al.
5,553,064 A    9/1996 Paff et al.
(Continued)

FOREIGN PATENT DOCUMENTS

EP    0646992 A1    4/1995
EP    648032 A1    4/1995
(Continued)

OTHER PUBLICATIONS

Andren et al.: CCK, The new IEEE 802.11 standard for 2.4 GHz wireless LANs, International IC Conf. Proceedings, pp. 25-39, May 3, 2000.
(Continued)

*Primary Examiner* — Kabir A Timory
(74) *Attorney, Agent, or Firm* — Howard Seo

(57) ABSTRACT

A modified preamble is used by extended devices that operate at higher rates, MIMO or other extensions relative to strict 802.11a-compliant devices. The extended devices might use multiple antenna techniques (MIMO), where multiple data streams are multiplexed spatially and/or multi-channel techniques, where an extended transmitter transmits using more than one 802.11a channel at a time. Such extensions to IEEE 802.11a can exist in extended devices. The modified preamble is usable for signaling, to legacy devices as well as extended devices, to indicate capabilities and to cause legacy devices or extended devices to defer to other devices such that the common communication channel is not subject to unnecessary interference. The modified preamble is also usable for obtaining MIMO channel estimates and/or multi-channel estimates. The modified preamble preferably includes properties that facilitate detection of conventional and/or extended modes ("mode detection") and provides some level of coexistence with legacy IEEE 802.11a devices.

14 Claims, 5 Drawing Sheets

(56) References Cited

U.S. PATENT DOCUMENTS

| | | |
|---|---|---|
| 5,694,421 A | 12/1997 | Park |
| 6,055,231 A | 4/2000 | Mesecher et al. |
| 6,118,806 A | 9/2000 | Niida et al. |
| 6,144,711 A | 11/2000 | Raleigh et al. |
| 6,226,508 B1 | 5/2001 | Takahashi et al. |
| 6,260,167 B1 | 7/2001 | Lo et al. |
| 6,304,750 B1 | 10/2001 | Rashid-Farrokhi et al. |
| 6,452,981 B1 | 9/2002 | Raleigh et al. |
| 6,473,467 B1 | 10/2002 | Wallace et al. |
| 6,563,460 B2 | 5/2003 | Stilp et al. |
| 6,661,857 B1 | 12/2003 | Webster et al. |
| 6,670,310 B2 | 12/2003 | Wojtecki |
| 6,678,310 B1 | 1/2004 | Andren et al. |
| 6,690,715 B2 | 2/2004 | Webster et al. |
| 6,757,322 B2 | 6/2004 | Schilling |
| 6,934,323 B2 | 8/2005 | Hara |
| 7,006,040 B2 | 2/2006 | Henderson et al. |
| 7,082,159 B2 | 7/2006 | Larsson |
| 7,088,782 B2 | 8/2006 | Mody et al. |
| 7,106,709 B2 | 9/2006 | Davidsson et al. |
| 7,106,784 B2 | 9/2006 | Eltawil et al. |
| 7,123,662 B2 | 10/2006 | Li et al. |
| 7,161,996 B1 | 1/2007 | Steele et al. |
| 7,177,369 B2 | 2/2007 | Crilly, Jr. |
| 7,184,495 B2 | 2/2007 | Thomson et al. |
| 7,190,748 B2 | 3/2007 | Kim et al. |
| 7,203,245 B1 | 4/2007 | Murphy |
| 7,269,127 B2 | 9/2007 | Mody et al. |
| 7,269,224 B2 | 9/2007 | Stuber et al. |
| 7,282,617 B2 | 10/2007 | Schinski et al. |
| 7,286,617 B2 | 10/2007 | Vanderperren et al. |
| 7,327,717 B2 | 2/2008 | Borowski et al. |
| 7,352,688 B1 * | 4/2008 | Perahia et al. ............... 370/206 |
| 7,400,643 B2 | 7/2008 | Hansen et al. |
| 7,423,989 B2 | 9/2008 | Hansen et al. |
| 7,453,793 B1 | 11/2008 | Jones, IV et al. |
| 7,466,667 B2 | 12/2008 | Jones, IV et al. |
| 7,539,260 B2 | 5/2009 | van Zelst et al. |
| 7,561,646 B2 | 7/2009 | Steele et al. |
| 7,583,746 B2 | 9/2009 | Aoki et al. |
| 7,586,884 B2 | 9/2009 | Awater et al. |
| 7,599,332 B2 | 10/2009 | Zelst et al. |
| 7,599,333 B2 | 10/2009 | Jones et al. |
| 7,647,069 B2 | 1/2010 | Zhang |
| 7,856,068 B1 | 12/2010 | Tung et al. |
| 7,916,803 B2 | 3/2011 | Gardner et al. |
| 7,945,007 B2 | 5/2011 | Steele et al. |
| 8,000,223 B2 | 8/2011 | Moorti et al. |
| 8,023,397 B2 | 9/2011 | Awater et al. |
| 8,218,427 B2 | 7/2012 | Lee et al. |
| 2001/0033603 A1 | 10/2001 | Olaker |
| 2002/0012411 A1 | 1/2002 | Heinzl et al. |
| 2002/0065047 A1 | 5/2002 | Moose |
| 2002/0101825 A1 | 8/2002 | Beck et al. |
| 2002/0105375 A1 | 8/2002 | Sorokine |
| 2002/0111142 A1 | 8/2002 | Klimovitch |
| 2002/0114269 A1 | 8/2002 | Onggosanusi et al. |
| 2002/0118635 A1 | 8/2002 | Nee |
| 2002/0122511 A1 | 9/2002 | Kwentus et al. |
| 2002/0160737 A1 | 10/2002 | Crawford |
| 2002/0163933 A1 | 11/2002 | Benveniste |
| 2003/0012160 A1 | 1/2003 | Webster et al. |
| 2003/0072255 A1 | 4/2003 | Ma et al. |
| 2003/0153275 A1 | 8/2003 | Oh et al. |
| 2003/0210646 A1 | 11/2003 | Ohseki et al. |
| 2003/0235255 A1 | 12/2003 | Ketchum et al. |
| 2003/0236108 A1 | 12/2003 | Li et al. |
| 2004/0001430 A1 | 1/2004 | Gardner |
| 2004/0005018 A1 | 1/2004 | Zhu et al. |
| 2004/0005022 A1 | 1/2004 | Zhu et al. |
| 2004/0030530 A1 | 2/2004 | Li et al. |
| 2004/0032825 A1 | 2/2004 | Halford et al. |
| 2004/0048574 A1 | 3/2004 | Walker et al. |
| 2004/0052231 A1 | 3/2004 | Ramaswamy et al. |
| 2004/0071104 A1 | 4/2004 | Boesel et al. |
| 2004/0100939 A1 | 5/2004 | Kriedte et al. |
| 2004/0105512 A1 | 6/2004 | Priotti |
| 2004/0114546 A1 | 6/2004 | Seshadri et al. |
| 2004/0116112 A1 | 6/2004 | Gray |
| 2004/0120428 A1 | 6/2004 | Maltsev et al. |
| 2004/0161046 A1 | 8/2004 | Schott et al. |
| 2004/0190560 A1 | 9/2004 | Maltsev et al. |
| 2004/0198265 A1 * | 10/2004 | Wallace et al. ............... 455/118 |
| 2004/0203383 A1 | 10/2004 | Kelton et al. |
| 2004/0204026 A1 | 10/2004 | Steer et al. |
| 2004/0240402 A1 | 12/2004 | Stephens |
| 2004/0242273 A1 | 12/2004 | Corbett et al. |
| 2004/0258025 A1 | 12/2004 | Li et al. |
| 2004/0266375 A1 | 12/2004 | Li et al. |
| 2005/0002327 A1 | 1/2005 | Li |
| 2005/0018754 A1 | 1/2005 | Song |
| 2005/0030886 A1 | 2/2005 | Wu et al. |
| 2005/0047384 A1 | 3/2005 | Wax et al. |
| 2005/0105460 A1 | 5/2005 | Suh et al. |
| 2005/0152314 A1 | 7/2005 | Sun et al. |
| 2005/0157801 A1 | 7/2005 | Gore et al. |
| 2005/0180353 A1 | 8/2005 | Hansen et al. |
| 2005/0237992 A1 | 10/2005 | Mishra et al. |
| 2005/0281241 A1 | 12/2005 | Webster et al. |
| 2006/0013180 A1 | 1/2006 | Gupta et al. |
| 2006/0013327 A1 | 1/2006 | Sugar et al. |
| 2006/0034389 A1 | 2/2006 | Aoki |
| 2006/0088120 A1 | 4/2006 | Hansen et al. |
| 2006/0258303 A1 | 11/2006 | Taira et al. |
| 2006/0270364 A1 | 11/2006 | Aoki |
| 2006/0281487 A1 | 12/2006 | Girardeau et al. |
| 2007/0117523 A1 | 5/2007 | Weber et al. |
| 2009/0238299 A1 | 9/2009 | van Zelst et al. |
| 2010/0061402 A1 | 3/2010 | van Zelst et al. |
| 2013/0070747 A1 | 3/2013 | Gardner et al. |

FOREIGN PATENT DOCUMENTS

| | | |
|---|---|---|
| EP | 0657968 A1 | 6/1995 |
| JP | 63033028 A | 2/1988 |
| JP | 07211392 | 8/1995 |
| JP | 11145896 A | 5/1999 |
| JP | 2001292128 A | 10/2001 |
| JP | 2003008676 | 1/2003 |
| JP | 2003018119 A | 1/2003 |
| JP | 2003503889 A | 1/2003 |
| JP | 2003069546 | 3/2003 |
| JP | 2003115812 | 4/2003 |
| JP | 2003143106 | 5/2003 |
| JP | 2003163669 A | 6/2003 |
| JP | 2003169008 A | 6/2003 |
| JP | 2003319005 A | 11/2003 |
| JP | 2003348048 | 12/2003 |
| JP | 2004503130 A | 1/2004 |
| JP | 2004153529 A | 5/2004 |
| JP | 2004214726 A | 7/2004 |
| JP | 2004289373 A | 10/2004 |
| JP | 2004297172 | 10/2004 |
| JP | 2004328267 A | 11/2004 |
| JP | 2004364286 A | 12/2004 |
| JP | 2005198214 A | 7/2005 |
| JP | 2005528002 A | 9/2005 |
| JP | 2005295401 A | 10/2005 |
| JP | 2006507753 | 3/2006 |
| JP | 2006197375 A | 7/2006 |
| WO | 0105088 A1 | 1/2001 |
| WO | 2004027921 A2 | 4/2004 |
| WO | 2004045102 A1 | 5/2004 |
| WO | 2005002073 A1 | 1/2005 |
| WO | 2005002141 A1 | 1/2005 |
| WO | 2005006700 A1 | 1/2005 |
| WO | 2005022760 A1 | 3/2005 |

OTHER PUBLICATIONS

Bangerter, Boyd et al.: "High-Throughput Wireless LAN Air Interface", 2003, Intel Technology Journal, vol. 7, No. 3, pp. 47-57.

(56) References Cited

OTHER PUBLICATIONS

Boer, Jan, et al., "Backwards compatability: How to make a MIMO-OFDM system backwards compatible and coexistence with 11a/g at the link level", 2003, IEEE 802.11-03/714r0, slides 1-26.

Halls, G. A., "Hiperlan—The 20 MBIT/S Radio Lan," IEE Colloquim on Radio LANs and MANs . . . , pp. 1-8 (1995).

IEEE, Part 11: Wireless LAN Medium Access Control (MAC) and Physical Layer (PHY) Specifications. 1999, IEEE, chapters 9 and 11.*.

IEEE Std 802.11-1999 (Reaff 2003), "Part 11: Wireless Lan Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2, Dec. 2003.

IEEE Std 802.11b-1999, "Part 11: Wireless Lan Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

Larsson, Erik G. et al.: "Preamble Design for Mulitple-Antenna OFDM-Based WLANs With Null Subcarriers", 2001, IEEE Signal Processing Letters, 8:11:285-288.

Li, Ye G. et al.: "Channel Estimation for OFDM Systems with Transmitter Diversity in Mobile Wireless Channels", 1999, IEEE J. Select Areas Commun., 17: 461-471.

M. Singh et al., "WWiSE Proposal: High throughput extension to the 802.11 Standard", Nov. 12, 2004, pp. 32-43, §20.3, IEEE 802.11-04/0886r5.

Mujtaba, Aon et al, "TGn Sync Proposal", IEEE 802.11-04/888r0, Aug. 2004.

Negi, Rohit et al.: "Pilot Tone Selction for Channel Estimation in a Mobile OFDM System", 1998, IEEE Trans. Consumer Electron, 44: 1122-1128.

Syed Aon Mujtaba, Agere Systems, et al., "TGn Sync Complete Proposal", Jan. 18, 2005, pp. 24-42, IEEE 802.11-04/888r8.

Syed Aon Mujtaba, Agere Systems, "TGn Sync Proposal Technical Specification", Jan. 18, 2005, pp. 110-135, §11, IEEE 802.11-04/0889r3.

Talisa, S.H et al.: "A Novel MSW Programmable Barker Coder/Decoder," Microwave Symposium Digest, MTT-S International, vol. 86, Issue: 1, Jun. 2, 1986, pp. 579-581.

Tung, Tai-Lai et al: "Channel Estimation and Adaptive Power Allocation for Performance and Capacity Improvement of Multiple-Antenna OFDM Systems", 2001, Proc. IEEE Signal Processing Workshop on Signal Processing Advances in Wireless Comm. 82-85.

Van Nee, Richard et al.: "New High-Rate Wireless LAN Standards", 1999, IEEE Commun. 37 82-88.

* cited by examiner

MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES

CROSS-REFERENCE TO RELATED APPLICATIONS

This The present application is a continuation of and claims priority to U.S. application Ser. No. 10/820,440, filed Apr. 5, 2004, entitled "MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES" and U.S. Provisional Patent Application No. 60/461,999, filed Apr. 10, 2003 entitled "MODIFIED PREAMBLE STRUCTURE FOR IEEE 802.11A EXTENSIONS," and assigned to the assignee hereof and hereby expressly incorporated by reference herein.

BACKGROUND OF THE INVENTION

The IEEE 802.11a standard defines data rates of 6 Mbps (megabits per second) up to 54 Mbps. For some applications, higher data rates for given modulations and data rates higher than 54 Mbps are desirable. Other extensions, such as the use of MIMO (multiple-input, multiple-output antenna systems and other extensions might be desirable. In order to avoid conflicts with existing standardized communications and devices, extended devices that extend beyond the limits of the 802.11a standard and legacy devices that comply with the existing standard and are not necessarily aware of extended standards both need to coexist in a common communication space and even interoperate at times.

Coexistence is where differing devices can operate in a common space and still perform most of their functions. For example, an extended transmitter transmitting to an extended receiver might coexist with a legacy transmitter transmitting to a legacy receiver and the extended devices can communicate while the legacy devices communicate, or at least where the two domains are such that one defers to the other when the other is communicating. Coexistence is important so that the adoption and/or use of extended devices (i.e., devices that are outside, beyond or noncompliant with one or more standards with which legacy devices adhere and expect other devices to adhere) do not require replacement or disabling of existing infrastructures of legacy devices.

Interoperability is where an extended device and a legacy device can communicate. For example, an extended transmitter might initiate a transmission in such a manner that a legacy device can receive the data sent by the extended transmitter and/or indicate that it is a legacy device so that the extended transmitter can adjust its operations accordingly. For example, the extended transmitter might revert to standards compliant communications or switch to a mode that, while not fully standards compliant, is available to the legacy receiver. In another situation, an extended receiver might successfully receive data from a legacy transmitter.

The IEEE 802.11a standard defines a 20 microsecond long preamble with a structure as shown in FIG. 1, having short training symbols S (0.8 microseconds each), a guard interval LG, long training symbols L (3.2 microseconds each) and a signal field (4 microseconds). The preamble is followed by data. The first eight microseconds comprises ten identical short training symbols that are used for packet detection, automatic gain control and coarse frequency estimation. The second eight microseconds comprise two identical long training symbols, L, preceded by a guard interval LG that is the same pattern as the last half (1.6 microseconds) of the long training symbol L. The long training symbols can be used for channel estimation, timing, and fine frequency estimation.

FIG. 2 shows a long training sequence, $L_1$, that is used to generate the signal representing the long training symbol in a conventional 802.11a preamble. This sequence represents values used over a plurality of subcarriers. As specified in the standard, the subcarriers span a 20 MHz channel and with 64 subcarriers, they are spaced apart by 312.5 kHz. By convention, used here, the first value in the sequence is the value for the DC subcarrier, followed by the value for the 1×312.5 kHz subcarrier, then the value for the 2×312.5=625 kHz subcarrier, etc., up to the 32nd value for the 31×312.5 kHz=9687.5 kHz subcarrier. The 33rd value corresponds to the −10 MHz subcarrier, followed by the −(10 MHz−312.5 kHz) subcarrier, and so on, with the 64 value being for the −312.5 kHz subcarrier.

As can be seen from FIG. 1, the DC value and the 28th through 38th values, corresponding to the edges of the 20 MHz channel, are zero. The output of a transmitter is a training symbol at a sample rate of 64 samples/symbol. The samples are obtained by taking a 64-point IFFT (inverse fast-Fourier transform) of the long training sequence, $L_1$ in this example. As used herein, a sequence in the frequency domain is expressed with uppercase letters (e.g., L(k)), while the corresponding time sequence is expressed with lowercase letters (e.g., l(k)).

One approach to obtaining higher data rates is the use of more bandwidth. Another approach, used by itself or as well as the use of more bandwidth, is MIMO (multiple-input, multiple-output) channels, where a plurality of transmitters transmit different data or the same data separated by space to result in possibly different multi-path reflection characteristics. In either case, care is needed for coexistence and interoperability between legacy devices and extended devices.

BRIEF SUMMARY OF THE INVENTION

A modified preamble is used by extended devices that operate at higher rates, MIMO or other extensions relative to strict 802.11a-compliant devices. The extended devices might use one or more of multiple antenna techniques (MIMO), where multiple data streams are multiplexed spatially and multi-channel techniques, where an extended transmitter transmits using more than one 802.11a channel at a time. Such extensions to IEEE 802.11a can exist in extended devices.

The modified preamble is usable for signaling, to legacy devices as well as extended devices, to indicate capabilities and to cause legacy devices or extended devices to defer to other devices such that the common communication channel is not subject to unnecessary interference. The modified preamble is also usable for obtaining MIMO channel estimates and/or multi-channel estimates.

The modified preamble preferably includes properties that facilitate detection of conventional and/or extended modes ("mode detection") and provides some level of coexistence with legacy IEEE 802.11a devices.

BRIEF DESCRIPTION OF THE DRAWINGS

FIG. 4 illustrates other long training sequences, usable by extended devices.

DETAILED DESCRIPTION OF THE INVENTION

The use of modified preambles is described herein. Such modified preambles can be used in packets sent over a wireless network, such as an 802.11a compliant wireless network. Such packets with modified preambles can be sent by transmitters according to embodiments of the present invention to be received by receivers according to embodiments of the present invention, as well as being received by legacy receivers that are not configured to receive and interpret the modified preambles as would be done with receivers according to embodiments of the present invention.

Figure 3:
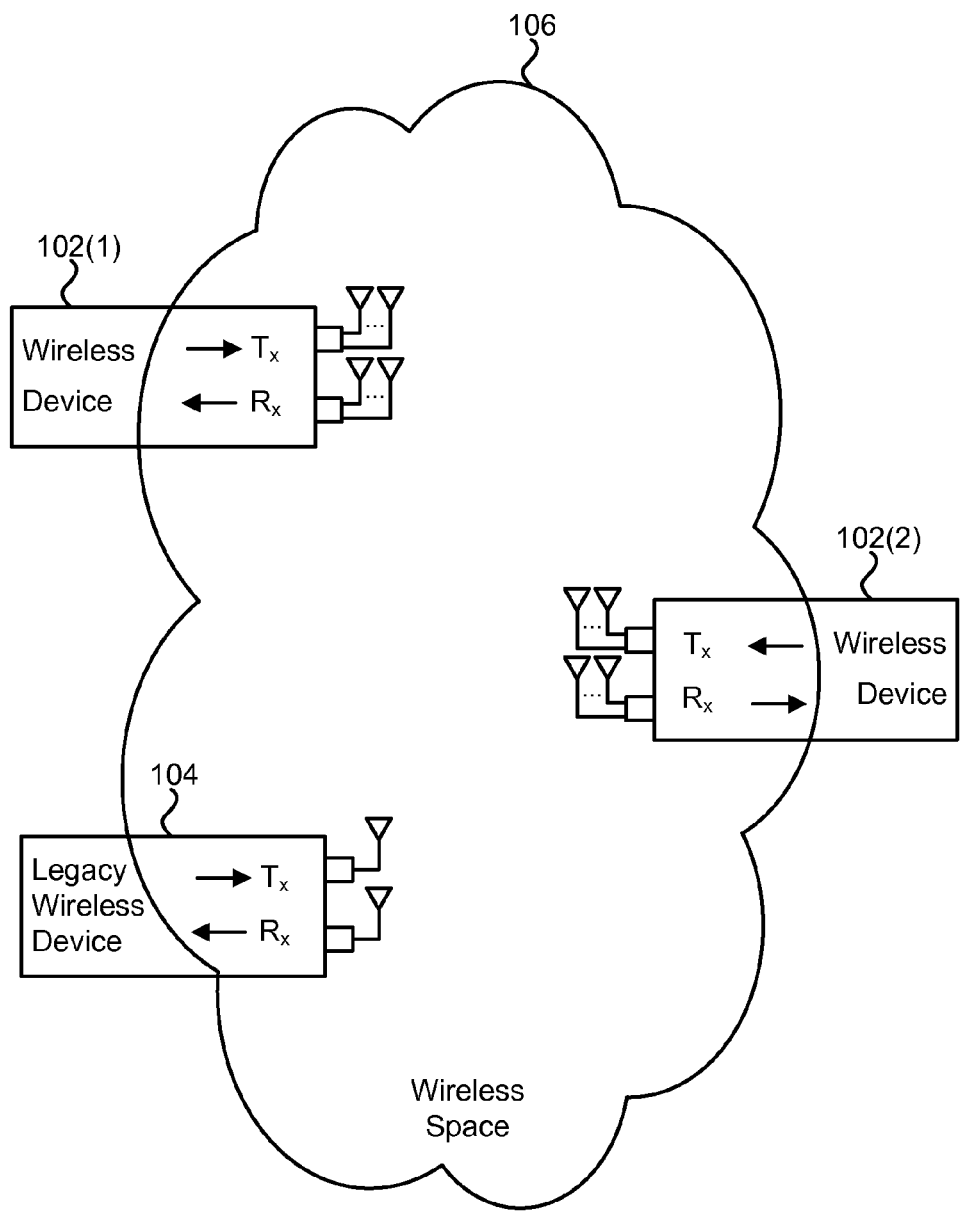
FIG. 3 illustrates several devices coupled via a wireless network.

FIG. 3 illustrates just one example of a wireless network being used for communications among transmitters and receivers as indicated. As shown, two wireless devices 102(1), 102(2) might use and interpret the modified preambles, while a legacy wireless device 104 might not be expecting the modified preambles, but might hear signals representing such preambles. Extended wireless devices 102 might operate using multiple channels and/or multiple transmit antennas and/or multiple receive antennas. Devices might have a single transmit antenna and a single receive antenna, or more than one transmit antenna and/or more than one receive antenna. While separate transmit and receive antennas are shown, antennas might be used for both transmitting and receiving in some devices.

Border 106 is not a physical border, but is shown to represent a space within which signals can be received from devices within the space. Thus, as one device transmits a signal representing a packet within border 106, other devices within border 106 pick up the signals and, as they are programmed, will attempt to determine if the signals represent packets and if so, then demodulate/decode the packets to obtain the data represented therein.

Many variations of a modified preamble might be used. An example is the preamble shown in FIG. 1, where the long training symbol is modified to use sequences such as one of the example sequences shown in FIG. 4.

Preferably, a modified preamble will be such that 1) an extended receiver (e.g., one that can advantageously handle modified preambles) can distinguish between MIMO packets (or other extended mode packets) and conventional 802.11a packets, 2) a legacy receiver (e.g., one that is not configured to receive and interpret the modified preambles and might not expect extended operations) can receive enough of a packet to determine either that the legacy receiver can understand the packet or can defer processing of incoming signals for a time, thereby allowing a measure of coexistence, 3) the modified preamble is usable for MIMO synchronization and channel estimation, and 4) the modified preamble is useful in a process of detecting the use of multi-channel transmission. In some embodiments of wireless devices according to the present invention, modified preambles are used that provide one, two, three or all of the preferable characteristics indicated above.

Combinations of Extensions

Multi-channel extended 802.11 systems might simultaneously transmit on several 20 MHz channels, whereas a legacy 802.11a system only transmits on a single 20 MHz channel using a single antenna, or if the legacy system does transmit with more than one antenna, each of the antennas transmits the same 802.11a signal, possibly with some delay differences between signals. As a result, data rates can be increased over 802.11a data rates using multiple transmit antennas or multiple channels or a combination of both. Thus, in a communication channel, such as the airspace of a wireless network cloud, several types of packets might be present:

1) Legacy SISO (single-input, single-output) 802.11a, 802.11b, or 802.11g packets transmitted in a single 20 MHz channel;

2) Extended SISO in multiple 20 MHz channels (e.g., 40, 60, 80, or 100 MHz channels)

3) Extended MIMO in a single 20 MHz channel;

4) Extended MIMO in multiple 20 MHz channels (e.g., 40, 60, 80, or 100 MHz channels)

Several satisfactory modified preamble structures can be derived by one of ordinary skill in the art after reading this disclosure. Some examples are described below. Preferably, the unmodified preamble structure can provide interoperability and coexistence between SISO and MIMO systems at various channel widths and coexistence between extended mode systems and legacy systems.

MIMO Single Channel (20 MHz)

Figures 1, 2:
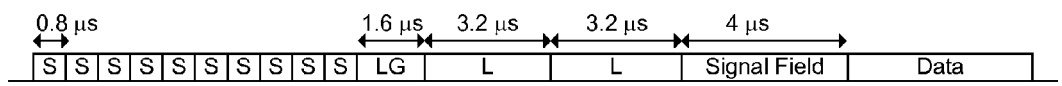
FIG. 1 illustrates the structure of a conventional 802.11a preamble.
FIG. 2 shows a long training symbol sequence, $L_1$, used for a conventional 802.11a preamble.

A modified preamble can use the same structure as the 802.11a preamble, with a different long training symbol determined from a long training symbol sequence $L_D$. By keeping the same short symbols S and using the same timing structure as depicted in FIG. 1, a receiver using the extended mode can use the same hardware for detecting the repetitive S and L symbols, even though the actual contents of the L symbols may be different for the 802.11a extensions.

Various embodiments of wireless devices might use various long training symbol sequences. In one example of a modification, the long training symbol sequence $L_D$ has one or more of the following features: 1) it is formulated such that channel estimation can be done for multiple transmitters, 2) it is such that it has a low cross-correlation with the unmodified 802.11a long training symbol sequence, and/or 3) it is usable in a relatively simple process of detecting whether the preamble is an 802.11a packet or an extended mode packet, usable in multipath channels. Suitable modified long training symbol sequences are shown as $L_2$ and $L_3$, in FIG. 4, but other variations should be apparent upon reading this description.

Channel Estimation

By allowing for channel estimation for multiple transmitters, MIMO or space-time coding techniques can be supported to achieve 802.11a extensions. One way to do this is by sending a different set of subcarriers from each transmitter. As an example, for the case of two transmitters, a device might modulate its OFDM subcarriers with the 64 values of $L_3$, shown in FIG. 4, where one transmitter transmits the odd subcarriers $\{1, 3, \ldots, 63\}$ and the other transmitter transmits the even subcarriers {0, 2, ..., 62}. Thus, one transmitter would take an IFFT of the odd subcarriers and transmit samples of that time varying signal and the other transmitter would take an IFFT of the even subcarriers and transmit samples of that time varying signal.

$L_3$ is a modified 802.11a long training symbol sequence, wherein some of the subcarriers of the standard 802.11a sequence $L_1$ (shown in FIG. 2) are inverted, and some subcarriers that are zero in $L_1$ are non-zero in $L_3$. The latter has some advantages for channel estimation, but is not necessary for the purpose of discriminating 802.11a packets from extended mode packets.

Low Cross-Correlation

Figure 4:
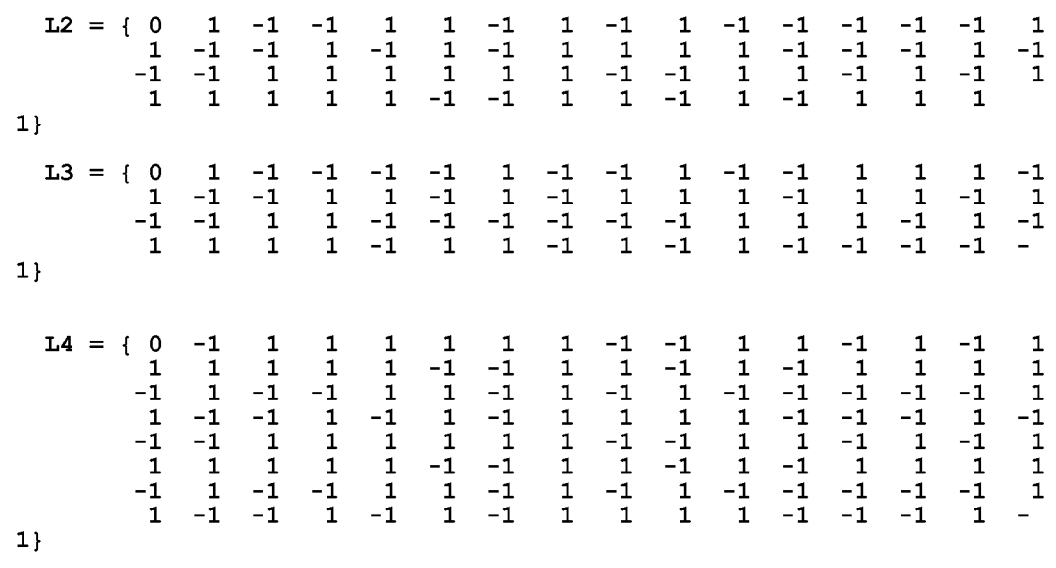

The second criterion is that the new training sequence should have a low cross-correlation with the conventional IEEE 802.11a training sequence. One way to achieve this is to invert every other group of four subcarriers, which is applied to sequence $L_2$ to get a new sequence $L_3$ that is nearly orthogonal to both $L_1$ and $L_2$. Further, $L_3$ is constructed such that there is also a low cross-correlation between the even and odd elements of $L_2$ and $L_3$. These sequences $L_2$ and $L_3$ are shown in FIG. 4. The low cross-correlation is illustrated by Equation 1 and Equation 2 (note that in Equation 1, a high cross-correlation would have right-hand side values closer to −32 or 32, since the sum is not normalized here).

$$\sum_{k=0}^{31} L_2(2k)L_3(2k) = -1 \qquad \text{(Equ. 1)}$$

$$\sum_{k=0}^{31} L_2(2k+1)L_3(2k+1) = 0 \qquad \text{(Equ. 2)}$$

Mode Detection

The low cross-correlation between even and odd elements of $L_2$ and $L_3$ supports the third criterion, as it makes it possible to detect extended mode packets by looking at the correlation of $L_2$ and $L_3$ with the odd and even subcarriers of a received packet.

Various methods can be available for a receiver to detect from a received signal whether a transmitter transmitted a conventional 802.11a packet or an extended mode packet. One method for detecting what type of packet was sent will now be described.

In this method, enough of the signal is received to identify what should be the two repeated long training symbols, typically sampled as two identical repetitions of 64 samples for each receive antenna. An FFT (fast-Fourier transform) of the sum of the two identical repetitions of 64 samples is taken, generating an output sequence $s_i(k)$, comprising 64 complex values per receive antenna, containing channel amplitudes and phases, as well as phase shifts caused by the long training symbol sequence that was actually used (e.g., sequences such as $L_1$, $L_2$, $L_3$ or $L_4$).

From the output sequence $s_i(k)$, the receiver generates two other sequences, $r_s(k)$ and $r_m(k)$, by multiplying $s_i(k)$ by the sequences $L_2$ and $L_3$ for each receive antenna i, as illustrated by Equations 3a and 3b.

$$r_{si}(k) = \sum_{k=0}^{63} s_i(k)L_2(k) \qquad \text{(Equ. 3a)}$$

$$r_{mi}(k) = \sum_{k=0}^{63} s_i(k)L_3(k) \qquad \text{(Equ. 3b)}$$

Next, the receiver calculates two metrics, $m_m$ and $m_s$, from $r_s(k)$ and $r_m(k)$ using a differential detection operation, such as that illustrated by Equations 4a and 4b.

$$m_s = \left\| \sum_{i=0}^{N-1} \sum_{k=2}^{26} [r_{si}(k)r_{si}^*(k-1) + r_{si}(k+37)r_{si}^*(k+36)] \right\| \qquad \text{(Equ. 4a)}$$

$$m_m = \qquad \text{(Equ. 4b)}$$
$$\left\| \sum_{i=0}^{N-1} \sum_{k=0}^{11} [r_{mi}(2k+3)r_{mi}^*(2k+1) + r_{mi}(2k+41)r_{mi}^*(2k+39) + \right.$$
$$\left. r_{mi}(2k+4)r_{mi}^*(2k+2) + r_{mi}(2k+42)r_{mi}^*(2k+40)] \right\|$$

If $m_m > c \cdot m_s$, then the receiver might assume that the received signal represents a conventional 802.11a packet, otherwise the receiver assumes the packet is an extended mode packet. The constant c is preferably equal to 1, but may be different.

SISO/MIMO Multiple Channel

Some modified preamble structures described herein provide interoperability and coexistence between SISO multi-channel packets/devices and MIMO multi-channel packets/devices, as well as coexistence between multi-channel packets/devices and legacy packets/devices.

Figure 5:
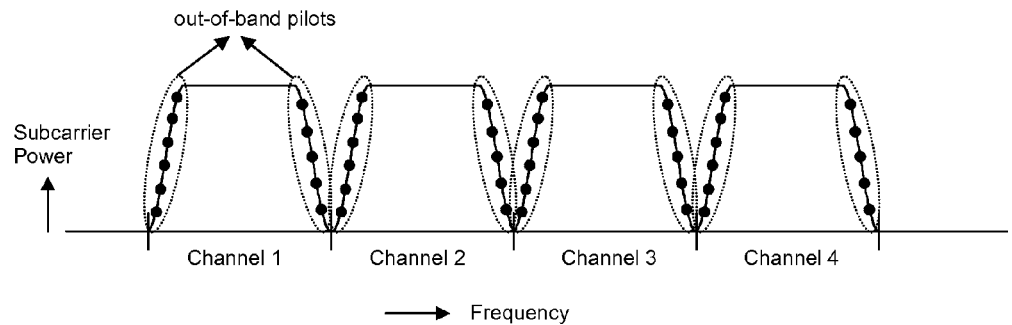
FIG. 5 illustrates one possible layout for out-of-band pilot tones for individual channels.

FIG. 5 illustrates the case where out-of-band pilots are attenuated for 20 MHz channels used to transmit a MIMO signal. The preamble structure can be identical to a conventional 802.11a preamble, except that the long training symbol sequence may use what are otherwise considered out-of-band subcarriers. Some or all of these out-of-band subcarriers may also be used in the data symbols to increase the data rate.

In the case of FIG. 5, different channels may be used by different devices, but it is also possible that the same device transmits on several channels simultaneously. For instance, one device may transmit on channels 1 and 4 simultaneously, while channels 2 and 3 are used by other devices.

Figure 6:
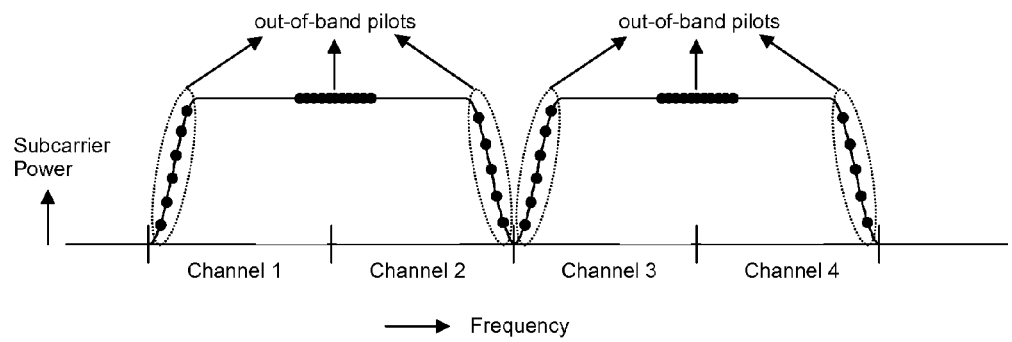
FIG. 6 illustrates one possible layout for out-of-band pilot tones for commonly assigned adjacent individual channels, where the out-of-band signals between adjacent bands are not attenuated.

If two adjacent channels are used simultaneously by one device, then there is no need to attenuate the "out-of-band subcarriers" in the middle of this 40 MHz band. An example of this is shown in FIG. 6. The out-of-band subcarriers that are in between the two 20 MHz channels thus need not be attenuated. In FIG. 4, the sequence $L_4$ is the long training symbol sequence for a 40 MHz preamble, which contains all 128 subcarrier values for a 40 MHz channel long training symbol. The first 32 values are identical to the last 32 values of a 20 MHz preamble, corresponding to the subcarriers in the left part of a 20 MHz channel. One difference between $L_4$ and two separate 20 MHz long training sequences is that the DC subcarriers are at different locations, so at the position where a 20 MHz channel would normally have its DC subcarrier, the 40 MHz sequence can have a nonzero subcarrier value. In $L_4$, these are subcarrier numbers 33 and 97, respectively.

With unattenuated out-of-band subcarriers, signaling information can be carried on those subcarriers during packet setup, such as signaling operating and/or extension modes during a preamble, and additional data can be carried on those subcarriers, to increase the data rate.

Figure 7:
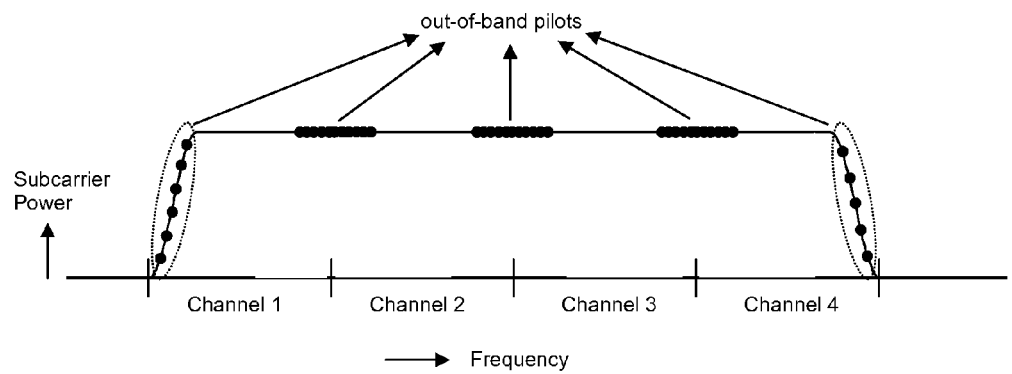
FIG. 7 illustrates a layout for out-of-band pilot tones for four adjacent individual channels assigned to a single device, where the out-of-band signals between adjacent bands are not attenuated.

FIG. 7 shows the case of four 20 MHz channels.

Figure 8:
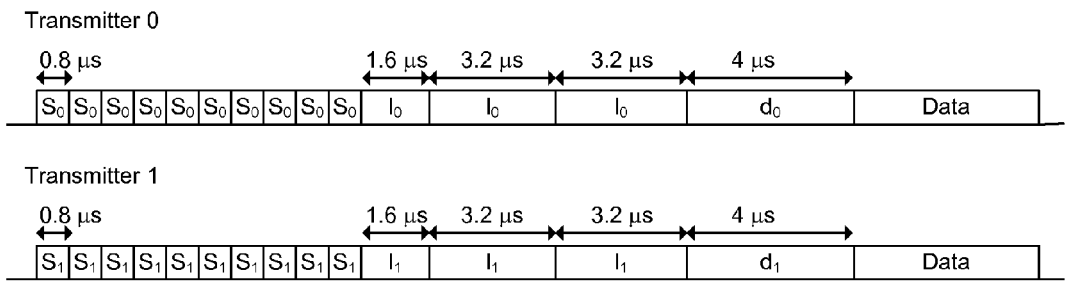
FIG. 8 illustrates a modified preamble usable for multi-channel packets with or without MIMO.

One example of a modified preamble is the preamble shown in FIG. 1 modified as shown in FIG. 8. The long training symbol values for these out-of-band subcarriers can be the same as in the case of FIG. 1. The long training symbol is followed by a replica of the Signal field with identical subcarrier values in each of the 20 MHz channels. This ensures that a receiver that operates on just one of the 20 MHz channels will still be able to successfully decode at least the first part of the packet containing the Signal field and defer for the rest of the packet, as decoding the Signal field provides the receiver with information about the length of the packet and thus how long to defer. The same technique can be extended to an arbitrary number of channels.

FIG. 8 shows a preamble for a two transmitter MIMO packet. The structure is the same as for 802.11a, but some differences are that a) $l_0$, $l_1$, $d_0$, $d_1$ may contain out-of-band subcarriers, b) $s_1$, $l_1$, $d_1$ can be cyclically shifted relative to $s_0$, $l_0$, $d_0$ or c) $l_0$ and $l_1$ can contain subcarrier sequences that have a low cross-correlation with the same subcarrier sequences of the 802.11a long training symbol sequence.

Interoperability

Interoperability between the different extended modes can be ensured by transmitting the same preamble and signal field in each 20 MHz channel. The preamble time structure can be the same as that of IEEE 802.11a, as illustrated in FIG. 1. For a 20 MHz MIMO transmitter, the long training symbol L can be modified to facilitate MIMO channel estimation and include out-of-band pilots. In one example of an extended transmitter using a plurality of channels, the transmitter transmits an identical copy of the preamble and signal field in each 20 MHz channel used by that transmitter where the out-of-band pilots only have to be attenuated at the edges of a multi-channel and not between adjacent channels of the multi-channel. The out-of-band subcarriers of the signal field in might contain different data bits for different 20 MHz channels, to signal information such as the transmitter's multi-band mode, MIMO mode, channel number, data rate, and/or coding rate.

By transmitting the same preamble and signal field in any 20 MHz channel, it is ensured that an extended device that only demodulates one 20 MHz channel at least is able to decode the signal field. From the information in the signal field, the single-channel extended device can either properly defer for the duration of the packet or find out what extended mode is used for this packet in the case that this information is encoded in the signal field. For instance, the receiver could detect from the signal field that the packet is transmitted over four adjacent channels, after which the extended receiver can decide to switch to a four-channel receiving mode.

Notice that it typically does not matter for a single-channel 20 MHz receiver whether the out-of-band subcarriers depicted in FIGS. 5-7 are attenuated. For instance, if a single-channel receiver demodulates channel 2 out of the 4 transmitted channels shown in FIG. 7, the receive filter of that single-channel receiver will partly attenuate the out-of-band subcarriers as well as suppress the adjacent channels 1 and 3 to the point where these adjacent channels do not cause interference to the desired signal of channel 2.

Coexistence

One method of having coexistence between extended devices and legacy IEEE 802.11a and IEEE 802.11g devices is by keeping the preamble structure in each 20 MHz channel the same as for IEEE 802.11a. IEEE 802.11a specifies an energy detect based defer behavior, which provides some level of coexistence. However, to guarantee that legacy devices properly defer for all extended mode packets down to received power levels of −82 dBm or other suitable levels, the receivers have to be able to successfully decode the signal field, which contains the length information of the packet.

Some ways to do this are described by Bangerter, B., et al., "High-Throughput Wireless LAN Air Interface", Intel Technology Journal, Vol. 7, Issue 3 (August 2003) (hereinafter "Bangerter") and Boer, J., et al., "Backwards Compatibility", IEEE 802.11 presentation, Document Number 802.11-03/714r0 (September 2003) (hereinafter "Boer").

Bangerter describes the use of multiple 802.11a preambles spread in frequency such that 20 MHz channel legacy 802.11a devices will defer for multiple channel devices, but additional advantages can be had through the use of out-of-band pilots or MIMO preambles, as described elsewhere herein.

Boer describes some possible MIMO preambles having some limited benefits. In one method described in Boer, each MIMO transmitter transmits an 802.11a preamble while the other transmitters transmit nothing. While this makes distinguishing easier, training is significantly longer and that reduces throughput. In another method described in Boer, each MIMO transmitter transmits a part of the 802.11a subcarriers. For example, for two transmitters, one transmitter transmits all odd subcarriers and the other transmitter transmits all even subcarriers. However, without more, mode detection based on the training symbols might not be possible with that technique.

A novel way of enabling coexistence or furthering coexistence for MIMO packets is to apply a cyclic delay shift on the long training symbol and Signal field IFFT outputs prior to applying the guard time extension. For example, assume L(k) and D(k) are the 64 subcarrier values for the long training symbol and Signal field symbol, respectively. For a conventional 802.11a single transmitter transmission, the time samples for the long training symbol are derived by taking the 64-point IFFT of L(k) to obtain l(i) and transmitting the samples of l(i). Thus, with the guard time, the long training symbol and guard time are constructed as [l(33:64)l(1:64)l(1:64)], i.e., the IFFT output is repeated twice and the last 32 samples are prepended to form the long training guard interval. As with the conventional timing, the long training guard interval (32 samples) is twice as long as the guard interval for 802.11a data symbols (16 samples). The signal field is formed by [d(49:64)d(1:64)], where d(1:64) are the 64 samples of the IFFT of D(k).

In the case of a two transmitter MIMO device, the first transmitter would transmit the long training symbol and signal field like that of 802.11a. The second transmitter would apply a cyclic shift such that instead of the IFFT output l(1:64), it uses the cyclically shifted samples ls=[l(33:64)l(1:32)] to construct the long training symbol samples [ls(33:64) ls(1:64)ls(1:64)]. For the signal field, it uses the shifted samples ds=[d(33:64)d(1:32)] to construct the signal field as [ds(49:64)ds(1:64)].

In a legacy 802.11a packet, one 3.2 microsecond repetition of the long training symbol L as shown in FIG. 1 is expressed in the time domain as the IFFT of L(k), where L(k) contains 64 subcarrier values, of which 52 are non-zero. The time samples l(i) are given as shown in Equation 5, where the subcarrier values of L(k):

$$l(i) = \sum_{k=0}^{63} L(k)\exp\left(j\frac{2\pi ik}{64}\right) \quad \text{(Equ. 5)}$$

In the extended modes described herein, some possible modifications will be described. First, L(k) can contain more than 52 non-zero subcarriers. Second, in the case of MIMO transmission, l(i) can have a cyclic shift that may be different for each transmitter. The shifted signal $l_k(i)$ can be derived from l(i) as $l_k(i)=l([i+64-d_k]\%64)$, where "%" denotes the modulo operator and $d_k$ is the cyclic delay of transmitter k in 20 MHz samples. This expression assumes a 20 MHz sampling rate, such that there are 64 samples in a 3.2 microsecond interval. An alternative method of generating the cyclic shift is to apply a phase ramp rotation to all subcarrier values of L(k) prior to calculating the IFFT, such as that shown by the example of Equation 6.

$$l_k(i) = \sum_{k=0}^{63} L(k)\exp\left(-j\frac{2\pi k d_k}{64}\right)\exp\left(j\frac{2\pi i k}{64}\right) \quad \text{(Equ. 6)}$$

A MIMO transmitter can have two or more transmit antennas (or antenna arrays, as the case may be). For a MIMO system with two transmit antennas and two different transmit data streams, preferred values for the cyclic delay values $d_k$ are 0 and 32 samples, respectively. This corresponds to a cyclic delay of 1.6 microseconds between the two transmitters. For three transmitters, $d_k$ can be 0, 22, and 43 samples, respectively. For four transmitters, $d_k$ can be 0, 16, 32, and 48 samples, respectively.

Figure 9:
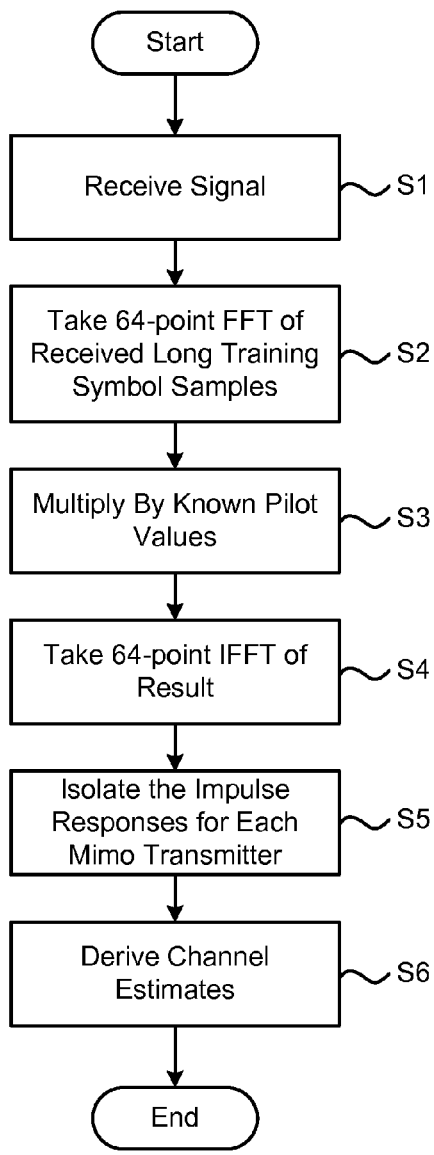
FIG. 9 is a flowchart illustrating one possible process for obtaining channel estimates for each transmitter signal in a MIMO system.

At the receiver side, the channel estimates for each transmitter signal can be estimated by a process such as that shown in FIG. 9. As shown there, the process begins with receiving signals and sampling for the long training symbol (step S1). Then, a 64-point FFT of the received long training symbol samples is done (step S2), as is done for conventional 802.11a preamble reception. Next, each subcarrier is multiplied by known pilot values (step S3), and an IFFT of the result is taken to get a 64-point impulse response estimate (step S4).

In the case of a MIMO transmission, these 64 samples contain the cyclic shifted impulse responses of all different transmitters. With that, the receiver can isolate the impulse responses for each MIMO transmitter (step S5). For MIMO with two transmit streams, this can be done by separating the first 32 samples and last 32 samples. For four transmit streams, groups of 16 samples can be extracted.

From the extracted impulse responses per transmitter, channel estimates can be derived (step S6) for all subcarriers by taking a 64-point FFT of each impulse response, where the sample values are appended by zero values to get 64 input values.

Signaling Extended Modes

There are several different ways to signal what mode is used:

1) Beaconing: Each access point regularly transmits beacons. By transmitting these beacons using a legacy 802.11a rate on all 20 MHz channels used by the access point, it can be ensured that any device can receive these beacons. The beacon can contain information about which channels are used simultaneously and what extended modes are supported, so each extended device can adjust its mode accordingly.

2) Multiple transmitter detection: If a special long training symbol is used for MIMO transmitters such as the cyclic shifted symbol described herein or other techniques described herein, then these special long training properties can be used to detect whether a packet is a MIMO packet. For instance, if the cyclic shifted long training symbol is used with two MIMO transmitters, the receiver can detect this by checking if the combined impulse response (obtained from step S4 above) contains two distinct impulse responses separated by 32 samples.

3) Signal field: The reserved bit of the Signal field can be used to signal the use of MIMO. It is also possible to extend the Signal field by transmitting an extra symbol. An example of this is shown in Boer. There is a reserved bit in the Signal field that is always zero for 802.11a devices but could be set to 1 to signal MIMO packets. It is also possible to send an extra signal field symbol after the normal 802.11a symbol to signal MIMO rates.

4) Out-of-band pilots: The out-of-band pilots of the long training symbol that are not present in 802.11a can be used to signal different modes. For example, subcarriers 28 through 38 in $L_1$ are zero, but they might be set (as with $L_2$, $L_3$, etc.) to some arbitrary but known values. The receiver can use the presence of these subcarriers as a way to detect MIMO modes and the particular pattern of presence to detect among several modes.

5) Out-of-band subcarriers in the Signal field: Extra subcarriers can be used to signal different extended modes. The use of extra subcarriers has advantages in that a) it does not cost extra preamble overhead, and b) a legacy 802.11a device ignores the out-of-band subcarriers.

What is claimed is:

1. A method for transmitting a modified preamble in a wireless communication system, the method comprising:
    determining short training symbols, a guard interval, a long training sequence and a signal field for a preamble, wherein the long training sequence comprises values for subcarriers in a wireless channel;
    modifying the long training sequence to determine a modified long training sequence, wherein the modifying comprises changing zero values in the long training sequence for subcarriers at edges of the channel to non-zero values to produce the modified long training sequence; and
    transmitting the short training symbols, the guard interval, the modified long training sequence and the signal field in a modified preamble.

2. The method of claim 1, wherein the modifying further comprises inverting values in the long training sequence for every other group of four subcarriers to produce the modified long training sequence.

3. The method of claim 1, wherein the transmitting the modified long training sequence comprises:
    determining a first modified long training symbol by sampling the values for odd subcarriers at 64 samples per symbol using a 64 point inverse fast Fourier transform; and
    determining a second modified long training symbol by sampling the values for even subcarriers at 64 samples per symbol using a 64 point inverse fast Fourier transform.

4. The method of claim 3, wherein the transmitting the modified long training sequence further comprises:
    transmitting the first modified long training symbol on a first transmitter; and
    transmitting the second modified long training symbol on a second transmitter.

5. The method of claim 1, wherein the wireless channel is 20 MHz wide.

6. The method of claim 1, wherein the wireless channel comprises 64 subcarriers spaced 312.5 kHz apart from each other.

7. The method of claim 1, wherein the preamble is an 802.11a preamble that is 20 microseconds long.

8. The method of claim 7, wherein the preamble comprises:
   10 short training symbols;
   one guard interval;
   two long training symbols; and
   one signal field.

9. The method of claim 8, wherein the short training symbols are each approximately 0.8 microseconds, the guard interval is approximately 1.6 microseconds, the long training symbols are each approximately 3.2 microseconds and the signal field is approximately 4 microseconds.

10. The method of claim 1, wherein the modified preamble is interoperable with legacy 802.11a devices and extended devices.

11. The method of claim 4, wherein the modified preamble comprises:
   10 short training symbols;
   one guard interval;
   the modified long training sequence comprising the first modified long training symbol and the second modified long training symbol; and
   one signal field.

12. A wireless device for transmitting a modified preamble in a wireless communication system, comprising:
   at least one processor configured to:
      determine short training symbols, a guard interval, a long training sequence and a signal field for a preamble, wherein the long training sequence comprises values for subcarriers in a wireless channel;
      modify the long training sequence to determine a modified long training sequence, wherein the modifying comprises changing zero values in the long training sequence for subcarriers at edges of the channel to non-zero values to produce the modified long training sequence; and
      transmit the short training symbols, the guard interval, the modified long training sequence and the signal field in a modified preamble.

13. A wireless device for transmitting a modified preamble in a wireless communication system, comprising:
   means for determining short training symbols, a guard interval, a long training sequence and a signal field for a preamble, wherein the long training sequence comprises values for subcarriers in a wireless channel;
   means for modifying the long training sequence to determine a modified long training sequence, wherein the modifying comprises changing zero values in the long training sequence for subcarriers at edges of the channel to non-zero values to produce the modified long training sequence; and
   means for transmitting the short training symbols, the guard interval, the modified long training sequence and the signal field in a modified preamble.

14. A non-transitory computer-readable medium comprising code, which, when executed by a computer, causes the computer to perform operations for transmitting a modified preamble in a wireless communication system, the computer-readable medium comprising:
   code for determining short training symbols, a guard interval, a long training sequence and a signal field for a preamble, wherein the long training sequence comprises values for subcarriers in a wireless channel;
   code for modifying the long training sequence to determine a modified long training sequence, wherein the modifying comprises changing zero values in the long training sequence for subcarriers at edges of the channel to non-zero values to produce the modified long training sequence; and
   code for transmitting the short training symbols, the guard interval, the modified long training sequence and the signal field in a modified preamble.

* * * * *